United States Patent

Kawamura et al.

[11] 4,323,297
[45] Apr. 6, 1982

[54] IMAGE FORMING OPTICAL SYSTEM USING A SEMICONDUCTOR LASER

[75] Inventors: Naoto Kawamura, Inagi; Koichi Masegi; Isao Hakamada, both of Yokohama; Haruo Uchiyama, Kawasaki; Takashi Kitamura, Yokohama; Masaaki Ishii, Kawasaki, all of Japan

[73] Assignee: Canon Kabushiki Kaisha, Tokyo, Japan

[21] Appl. No.: 133,316

[22] Filed: Mar. 24, 1980

[30] Foreign Application Priority Data

Mar. 30, 1979 [JP] Japan ................... 54-39075

[51] Int. Cl.³ .............................. G02B 27/17
[52] U.S. Cl. ........................ 350/6.8; 350/421
[58] Field of Search ............ 331/94.5 H; 358/206, 358/231, 230; 350/6.8, 421

[56] References Cited

U.S. PATENT DOCUMENTS

3,549,800 12/1970 Baker ..................... 358/206
4,176,325 11/1979 Kajimura et al. .......... 331/94.5 H
4,188,113 2/1980 Hiraga .................... 350/6.8
4,203,652 5/1980 Hanada ................... 350/182

Primary Examiner—John K. Corbin
Assistant Examiner—B. de los Reyes
Attorney, Agent, or Firm—Fitzpatrick, Cella, Harper & Scinto

[57] ABSTRACT

In a semiconductor laser optical system which uses a light source a semiconductor laser having different diverging points and divergence angles in orthogonal directions and in which the light beam from the light source is imaged on a scanned surface, only a spherical surface optical system is provided between the semiconductor laser and the scanned surface. The spherical surface optical system includes two partial optical systems, i.e. a first image forming optical system and a second image forming optical system as viewed from the light source side. By selecting the optical constant of one of the two image forming optical systems to a predetermined value, the peak power of the image forming spot on the scanned surface is maximized.

6 Claims, 7 Drawing Figures

IMAGE FORMING OPTICAL SYSTEM USING A SEMICONDUCTOR LASER

BACKGROUND OF THE INVENTION

1. Field of the Invention

This invention relates to an optical system in an apparatus or a measuring device using a semiconductor laser as a light source.

2. Description of the Prior Art

Generally, the light emitted from a semiconductor laser has different divergence angles in orthogonal directions. Diverging origins also differ in the orthogonal directions. This is attributable to the internal structure of the semiconductor laser itself, and more particularly to the fact that the area of the light emitting portion is in a rectangular form instead of a circular form as in a gas laser.

Figure 1A:
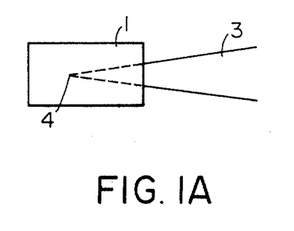
FIG. 1 illustrates the light emission characteristics of a semiconductor laser.
Figure 1B:
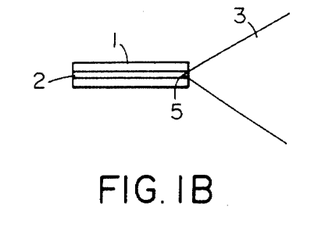

FIG. 1 of the accompanying drawings shows the diverging state of the beam from a semiconductor laser. FIG. 1(A) is a view of the semiconductor laser as seen from thereabove, and FIG. 1(B) is a view of the semiconductor laser as seen from the side thereof. In FIG. 1, reference numeral 1 designates the chip of the semiconductor laser, and reference numeral 2 designates the juncture surface. The diverging origin in a direction parallel to the juncture surface of the beam 3 (hereinafter referred to as the lateral direction) is indicated by 4, and the diverging origin in a direction perpendicular to the junction surface (hereinafter referred to as the longitudinal direction) is indicated by 5. The diverging origin 4 in the lateral direction is situated at a position spaced apart from the emergence surface, and the diverging origin in the longitudinal direction is situated at a position near the emergence surface.

As a method for correcting the difference in position between the beam waists in the longitudinal and lateral directions, there is a method as disclosed, for example, in Japanese Laid-open Patent Application No. 24542/1977 wherein the diverging origins in orthogonal directions are made coincident by cylindrical lenses of different curvature radii whose bus bars are orthogonal to each other.

The method of correcting such diverging origins by an optical system (this will hereinafter be referred to as the correction of $A_s$) enables regularization of the beam waist positions and obtainment of a small image forming spot. This is not directed to obtainment of an image forming spot but is a condition required when the beam is simply collimated for use in an interference experiment.

However, correcting $A_s$ is a very serious matter to the adjustment of an optical system. That is, to cause different diverging origins in two orthogonal directions to be coincident at a single point, the same adjustment must be effected twice with respect to the two orthogonal directions and this is very cumbersome procedure. Moreover, the adjustments cannot always be effected independently of each other, but when one is adjusted, the other may get out of order and thus, the adjustments require skilled technicians.

Further, the quantity of such $A_s$ is not constant but differs from one semiconductor laser to another. Not only in lasers of different construction but also in lasers of the same construction, the quantity of $A_s$ fluctuates depending on the manufacturing lot. Accordingly, correcting such $A_s$ in an optical system premises the change of the optical system for individual semiconductor lasers or the provision of an adjusting mechanism, and this leads to an increased burden of the optical system and increased cost and cumbersomeness. Furthermore, even in the same lasers, the quantity of $A_s$ may also be varied by current value.

On the other hand, where a semi-conductor laser is used for image recording or display, unlike the case where it is used for interference experiment, there is no necessity of regularizing the diverging origins. This is a problem concerned only with the shape of the image forming spot and the peak power, and correction of $A_s$ will be unnecessary if the specification necessary for effecting image recording or display is satisfied.

SUMMARY OF THE INVENTION

It is an object of the present invention to provide an image forming optical system using as a light source a semiconductor laser generally having $A_s$ and in which the peak power of the image forming spot is maximized without correcting $A_s$.

It is a further object of the present invention to provide an optical system in which a spherical surface symmetrical optical system is used as an image forming optical system to thereby regularize the positions of the peak power in the orthogonal directions of the image forming spot.

It is still a further object of the present invention to provide an optical system suited as an image forming optical system having a deflecting system for deflecting the light beam from a semiconductor laser light source in a predetermined direction.

In the semiconductor laser optical system according to the present invention, it is possible to obtain an optimal and simple optical system by knowing the divergence angle (orientation characteristic) of the beam emitted from a semiconductor laser and the quantity of $A_s$. The optimal system means determining the various quantities of the optical system (e.g. focal length, F-number, etc.) in accordance with the characteristic of the laser and setting such quantities so that the peak power of the image forming spot becomes maximum.

That is, where a semiconductor laser is used as the light source and an image forming spot is formed on a certain surface by an image forming lens, the F-number, focal length, etc. of the image forming lens are selected in accordance with the characteristic of the semiconductor laser and the magnification of the optical system is set in accordance with the characteristic of the laser, whereby the peak power of the image forming spot can be maximized.

In the semiconductor laser optical system according to the present invention, of the light beam from the semiconductor laser, the position of the beam waist of the light beam of the component in a direction having a great divergence angle (said longitudinal direction) is made substantially coincident with the position of the scanned surface and even if the position of the beam waist of the light beam of the component in a direction having a small divergence angle (said lateral direction) is more or less deviated from the position of the scanned surface, the various quantities of the optical system are appropriately set to thereby provide an optimal optical system.

In the semiconductor laser optical system according to the present invention, the spherical surface image forming optical system for imaging the light beam from the semiconductor laser on the scanned surface is divided into a first spherical surface image forming optical system and a second spherical surface image forming optical system, as viewed from the semiconductor laser side, and one of these image forming optical systems, desirably, the first spherical surface image forming optical system, is provided with a predetermined focal length to thereby provide an optimal optical system.

In the semiconductor laser optical system according to the present invention, the first spherical surface optical system has such a focal length which makes the light beam from the semiconductor laser into a substantially collimated beam. Accordingly, where a deflecting system is combined with this semiconductor laser optical system, the deflector may appropriately be disposed rearwardly of the first spherical surface optical system. The fact that a location in which the light beam from the light source becomes substantially parallel is thus present in the optical system is suited for a case where the optical system is used as a scanning system using a deflector.

The invention will become more fully apparent from the following detailed description thereof taken in conjunction with the accompanying drawings.

DESCRIPTION OF THE PREFERRED EMBODIMENTS

Figure 2:
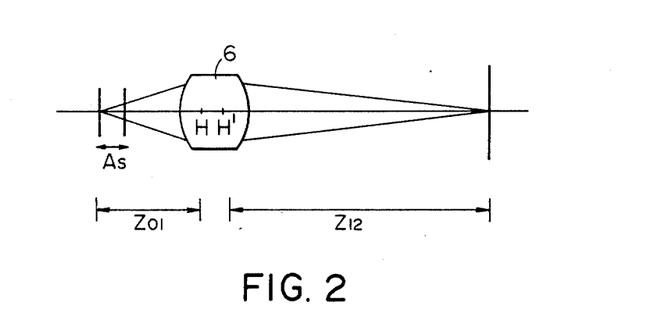
FIGS. 2 and 3 specifically illustrate the principle of the semiconductor laser optical system according to the present invention.

It is now assumed that an optical system has been given as shown in FIG. 2 and that the distance from the light emitting origin of a semiconductor laser to the forward principal point H of a lens 6 is $z_{01}$ and the distance from the rearward principal point of the lens to the image forming side beam west is $z_{12}$.

If the amplitude distribution of the laser at the light emitting origin is $U_0(x_0, y_0)$ (this is a beam west and therefore has no phase difference), the amplitude distribution on the entrance pupil plane of the lens is given by $$U_1(x_1, y_1) = \frac{e^{ikz_{01}}}{i\lambda z_{01}} \cdot e^{ik\frac{x_1^2 + y_1^2}{2z_{01}}} \iint U_0(x_0, y_0) e^{-ik\frac{(x_1 x_0 + y_1 y_0)}{z_{01}}} dx_0 dy_0$$

where $k = 2\pi/\lambda$, $x_1$ and $y_1$ are the co-ordinates on the entrance pupil plane and the integration is effected on the light source surface. Here, for the ensuing discussion, the above formulas are reduced down to one dimension and written as $$U_1(x_1) = \sqrt{\frac{e^{ikz_{01}}}{i\lambda z_{01}}} \cdot e^{ik\frac{x_1^2}{2z_{01}}} \int U_0(x_0) e^{-ik\frac{x_1 x_0}{z_{01}}} dx_0 \quad (1)$$

This is because the construction of the light emitting portion of the semiconductor laser forms a rectangle and if two orthogonal directions are taken in x- and y-direction and variable separation is effected, they can be handled independently with respect to the two directions.

If it is assumed that by the use of such $U_1(x_1)$, a spot has been formed on the image forming surface (the surface lying at a distance of $z_{12}$) by the lens 6, the amplitude distribution $U_2(x_2)$ on that surface is expressed as $$U_2(x_2) = \sqrt{\frac{e^{ikz_{12}}}{i\lambda z_{12}}} \cdot e^{ik\frac{x_2^2}{2z_{12}}} \int_{-\infty}^{\infty} R(x_1) U_1(x_1) e^{-ik\frac{x_1^2}{2f}} e^{ik\frac{(x_2-x_1)^2}{2z_{12}}} dx_1$$

$$= \sqrt{\frac{e^{ikz_{12}}}{i\lambda z_{12}} \cdot \frac{e^{ikz_{01}}}{i\lambda z_{01}}} e^{ik\frac{x_2^2}{2z_{12}}} \int_{-\infty}^{\infty} \int_{U_0} R(x_1) U_0(x_0) e^{ik\frac{x_1^2}{2}\left(\frac{1}{z_{01}} + \frac{1}{z_{12}} - \frac{1}{f}\right)} \times e^{-ik\frac{x_1 x_0}{z_{01}}} \times e^{-ik\frac{x_1 x_2}{z_{12}}} dx_0 dx_1$$

where f represents the focal length of the lens 6 and $R(x_1)$ represents the pupil function of the lens 6.

Now, assume that $$R(x_1) = \begin{cases} 0 & \text{for } |x_1| \geq a \\ 1 & |x_1| < a \end{cases}$$

Also, if $(1/z_{01}) + (1/z_{12}) - (1/f) \equiv \xi$, the following relation can be readily introduced for $\xi$ and As:

$$\xi \approx As/z_{01}^2 \quad (3)$$

By carrying out a numerical calculation by using formulas (2) and (3), an optical system which will maximize the central intensity of the image forming spot is set. Now, assuming that the optical system comprises two partial optical systems, i.e. a first spherical surface image forming optical system and a second spherical surface image forming optical system as viewed from the light source side and that the first spherical surface image forming optical system has the function as a collimating optical system which makes the divergent light beam from the light source into a substantially parallel beam, it is to be understood that an optimal optical system in which the central intensity of the image forming spot is maximum is to be obtained.

To obtain an optimal optical system in such a condition, numerical calculation of formula (2) may be carried out by varying the constants of the optical system (focal length, F-number, etc.) as parameters and a variation in the central intensity may be found, and through our analysis, we could rewrite formula (2) into an approximate formula which would raise no problem in practice, thereby obtaining an optimal system analytically.

For that purpose, description will first be made with the amplitude distribution $U_0(x_0)$ at the light emitting origin made into a far field pattern.

That is, it is assumed that $$BS(x_1) \equiv \sqrt{\frac{e^{ikz_{01}}}{i\lambda z_{01}}} \int_{-\infty}^{\infty} U_0(x_0) e^{-ik\frac{x_1 x_0}{z_{01}}} dx_0 \quad (4)$$

where $BS(x_1)$ represents the amplitude distribution on the entrance pupil plane of the lens.

Such conversion is based on the fact that the measurement of the light emitting origin $U_0(x_0)$ is generally very difficult and inaccurate because it is usually of the order of several $\mu m$, and that it is difficult to obtain a true value because there is caused an influence of diffraction of the measuring system and therefore, if the amplitude distribution at the light emitting origin is made into a far field pattern, the measurement can be effected easily and accurately without the intermediary of an optical system and with reduced error.

For such reason, formula (2) may be rewritten into $$U_2(x_2) = \sqrt{\frac{e^{ikz_{12}}}{i\lambda z_{12}}} e^{ik\frac{x_2^2}{2z_{12}}} \int_{-\infty}^{\infty} R(x_1) BS(x_1) e^{ik\frac{x_1^2}{2}\xi} \times e^{-ik\frac{x_1 x_2}{z_{12}}} dx_1 \quad (5)$$

If the light source mode is the basic mode TEM00, formula (4) generally effects a gaussian distribution, which is expressed as $$BS(x_1) = \frac{\text{const}}{\sqrt{w_{1x}}} e^{-\frac{x_1^2}{w_{1x}^2}} \quad (4')$$

where BS is the abbreviation of beam spread and $w_{1x}$ represents the expanse of the distance in which the intensity is reduced to $1/e^2$.

By substituting formula (4') for formula (5), formula (2) can after all be expressed as follows by using a quantity which is easy to measure:

$$U_2(x_2) = \text{const} \int_{-\infty}^{\infty} R(x_1) e^{-\frac{x_1^2}{w_{1x}^2} + ik\frac{\xi x_1^2}{2}} \cdot e^{-ik\frac{x_1 x_2}{z_{12}}} dx_1 \quad (6)$$

Here, it is tried to develop $R(x)$ by Hermite-Gaussian function.

$$R(x_1) = \sum_n B_n \Phi_n(x_1) \quad (7)$$

where $\Phi_n(x_1) = \frac{N_n}{\sqrt{wa}} H_n\left(\sqrt{2}\frac{x_1}{wa}\right) e^{-\frac{x_1^2}{wa^2}}$ $$N_n = \left(\sqrt{\frac{2}{\pi}} \cdot \frac{1}{2^n n!}\right)^{\frac{1}{2}}$$

$H_n(\xi)$ is n degree of Hermite function and is given, for example, by
$H_0(\xi)=1$
$H_1(\xi)=2\xi$
$H_2(\xi)=4\xi^2-2$
$H_3(\xi)=8\xi^3-12\xi$ The development coefficient $B_n$ when development is effected by such $\phi_n(x_1)$ (which forms an orthogonal function) can be obtained in the following manner:

$$B_n = \int_{-\infty}^{\infty} R(x_1) \Phi_n(x_1) dx_1$$

$$= \int_{-a}^{a} \Phi_n(x_1) dx_1$$

According to our calculation, $B_n$ is expressed by
$B_0 = 0.9428$
$B_1 = 0$
$B_2 = -2.51 \times 10^{-4}$
$B_3 = 0$ and it has been found that $B_n$ can be set so that most power is concentrated upon $B_0$.

This means that when $R(x_1)$ is developed by the orthogonal function of $\phi_n(x_1)$ like formula (7), considerable accuracy can be obtained by taking only the term $n=0$ of the development.

Figure 3:
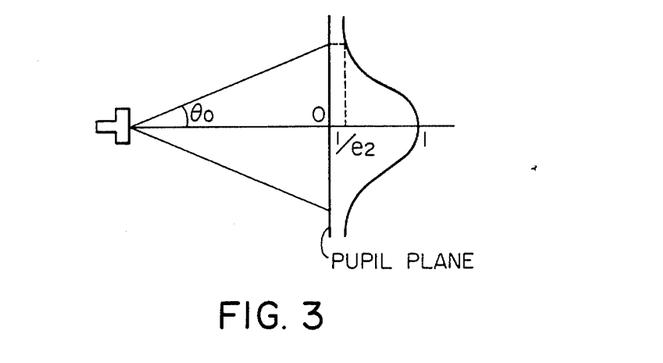

At this time, formula (6) becomes $$U_2(x_2) \approx \text{const} \int_{-\infty}^{\infty} B_0 N_0 e^{-\frac{x_1^2}{wa^2} - \frac{x_1^2}{w_{1x}^2} + ik\frac{\xi x_1^2}{2}} \cdot e^{-ik\frac{x_1 x_2}{z_{12}}} dx_1$$

and this is analytically solved in integration as follows:

$$U_2(x_2) = \text{const} \cdot \quad (8)$$

$$B_0 N_0 \sqrt{\frac{\sqrt{K}}{1+K-is}} e^{-\frac{x_2^2}{w_{2x}^2} - \frac{isx_2^2}{(1+K)w_{2x}^2} + \frac{ikx_2^2}{2z_{12}}}$$

where $$K = w_{1x}^2/wa^2 = 0.9702(w_{1x}^2/a^2) \quad (8')$$

$$S = (K\xi/2)w_{1x}^2 = (K/2) \sin^2 \theta_0 \cdot A_s$$

and $\theta_0$ represents the angle (FIG. 3) at which the intensity distribution of the laser light is reduced down to $1/e^2$ of the maximum value when the laser light is projected on a plane:

$$w_{2x} \equiv \frac{\lambda z_{12}}{\pi w_{1x}} \sqrt{1+K} \cdot \sqrt{1 + \frac{S^2}{(1+K)^2}}$$

Here, the peak power $I(x_2=0) \equiv I_0$ is expressed as $$I_0 = \text{const} \sqrt{\frac{K}{(1+K)^2 + S^2}} \quad (9)$$

Here, the description is brought back to two dimensions and the peak power $I_0$ is rewritten into $$I_0 = \text{const} \cdot \sqrt{\frac{K_x}{(1+K_x)^2 + S_x^2}} \cdot \sqrt{\frac{K_y}{(1+K_y)^2 + S_y^2}}$$

where $$\begin{cases} w_{1x} = f_c \sin\theta_{ox} \\ w_{1y} = f_c \sin\theta_{oy} \\ K_x = 0.970 \frac{\sin^2\theta_{ox}}{a^2} \cdot f_c^2 = \alpha_x \cdot f_c^2 \\ K_y = 0.970 \frac{\sin^2\theta_{oy}}{a^2} \cdot f_c = \alpha_y \cdot f_c^2 \\ f_c\text{: focal length of the first image forming} \\ \quad \text{optical system acting as a collimater lens} \\ S_x = \frac{\pi}{\lambda} \sin^2\theta_{ox} \cdot A_s \\ S_y = 0 \\ a\text{: radius of the exit pupil of the first image} \\ \quad \text{forming optical system} \end{cases}$$

After all, the peak power $I_0$ can be written as follows with $f_c$ alone as a variable:

$$I_0(f_c) = \text{const} \cdot \sqrt{\frac{\alpha_x f_c^2}{(1+\alpha_x f_c^2)^2 + S_x^2}} \cdot \sqrt{\frac{\alpha_y f_c^2}{(1+\alpha_y f_c^2)^2}}$$

Here, it is to be understood that $f_c$ for which $I_0$ becomes maximum when the focal length $f_c$ of the first image forming optical system is varied is to be obtained.

From $\partial I_0/\partial f_c = 0$, $$(\alpha_x t + 1)(1 - \alpha_x \cdot \alpha_y \cdot t^2) + S_x^2 = 0$$

where $t = f_c^2$

Here, by the use of the solution $$t = \frac{\gamma}{\sqrt{\alpha_x \cdot \alpha_y}}$$

when $S \approx 0$ and with S being small when $S \neq 0$, the following is obtained:

$$t = f_c^2 \approx \frac{\gamma}{\sqrt{\alpha_x \cdot \alpha_y}} \left(1 + \frac{S_x^2}{2\left(1 + \sqrt{\frac{\alpha_x}{\alpha_y}}\right)}\right)$$

However, when $\gamma \approx 1$ and the influence of the high degree of term of the development is taken into account, a value up to the order of 0.8–1.2 can be assumed. Practically, a value up to $\gamma = 0.7$–1.4 is effective.

Example (1)

When
$\theta_{ox} = 8.5°$, $\theta_{oy} = 22.5°$ and $A_s = 0$,
$a = 2.2$ mm $$\alpha_x = 0.970 \frac{\sin^2\theta_{ox}}{a^2} = 4.38 \times 10^{-3}$$

$$\alpha_y = 0.970 \frac{\sin^2\theta_{oy}}{a^2} = 0.037$$

$$\therefore f_c^2 = t = \frac{1}{\sqrt{0.037 \times 4.38 \times 10^{-3}}} = 78.4$$

$\therefore f_c = 8.85$ mm  $\therefore F_{no} = 2.01$

Accordingly, when the semiconductor laser of the above-described characteristic is imaged by an image forming lens by the use of a collimator lens having an exit pupil radius of 2.2 mm, the peak power of the imaged spot is maximized.

Example (2)

$\theta_{ox} = 8.5°$  $\theta_{oy} = 22.5°$  $A_s = 10$ μm  $\lambda = 0.8$ μm
$a = 2.2$ mm
$\alpha_x = 4.38 \times 10^{-3}$
$\alpha_y = 0.037$
$S_x = 0.858$
$\therefore f_c^2 = 99.9$  $\therefore f_c = 10$ mm Example (3)

$\theta_{ox} = 8.5°$  $\theta_{oy} = 22.5°$  $A_s = 0$  $\lambda = 0.8$ μm
$a = 3$ mm
$\alpha_x = 2.35 \times 10^{-3}$
$\alpha_y = 0.0158$
$S_x = 0$
$\therefore f_c^2 = 164.11$
$f_c = 12.8$ mm Example (4)

Figure 4:
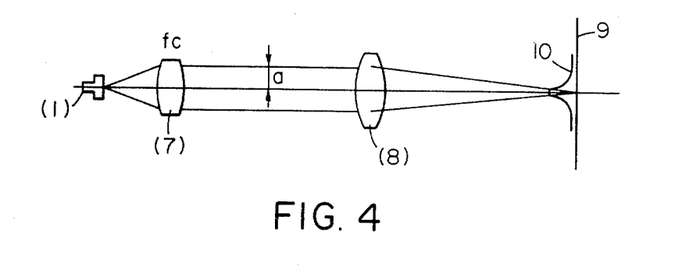
FIG. 4 is a schematic view showing the semiconductor laser optical system of the present invention.

$\theta_{ox} = 8.5°$  $\theta_{oy} = 22.5°$  $A_s = 10$ μm  $\lambda = 0.8$ μm
$a = 3$ mm
$\alpha_x = 2.35 \times 10^{-3}$
$\alpha_y = 0.0158$
$S_x = 0.858$
$f_c^2 = 164.11 (1 + 0.266) = 207.7$
$\therefore f_c = 14.4$ mm FIG. 4 shows the construction of the optical system according to Examples 1–5. Designated by 1 is a semiconductor laser, 7 a first image forming optical system which is a collimator optical system, 8 a second image forming optical system, 9 an image forming surface (for example, a recording surface or a display surface), and 10 an image forming spot.

By using the first image forming optical system having the focal length obtained in the Examples, it is possible to provide a so-called optimal optical system which maximizes the peak power of the image forming spot.

Figure 5:
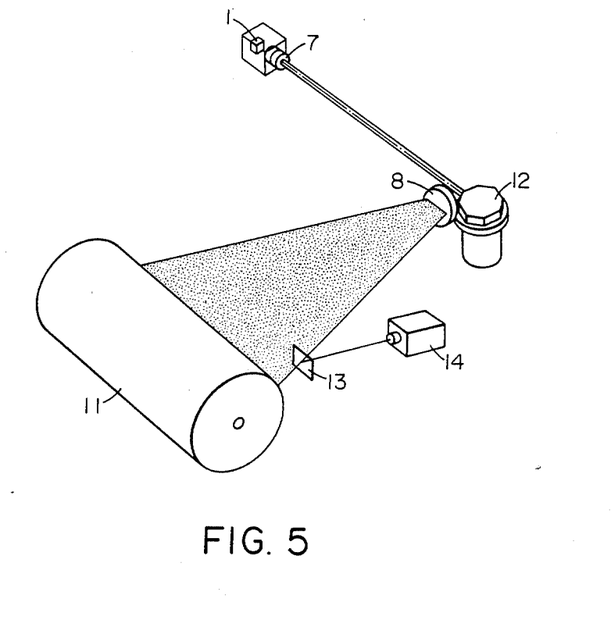
FIGS. 5 and 6 show an embodiment of the scanning recording apparatus to which the semiconductor laser optical system of the present invention is applied.
Figure 6:
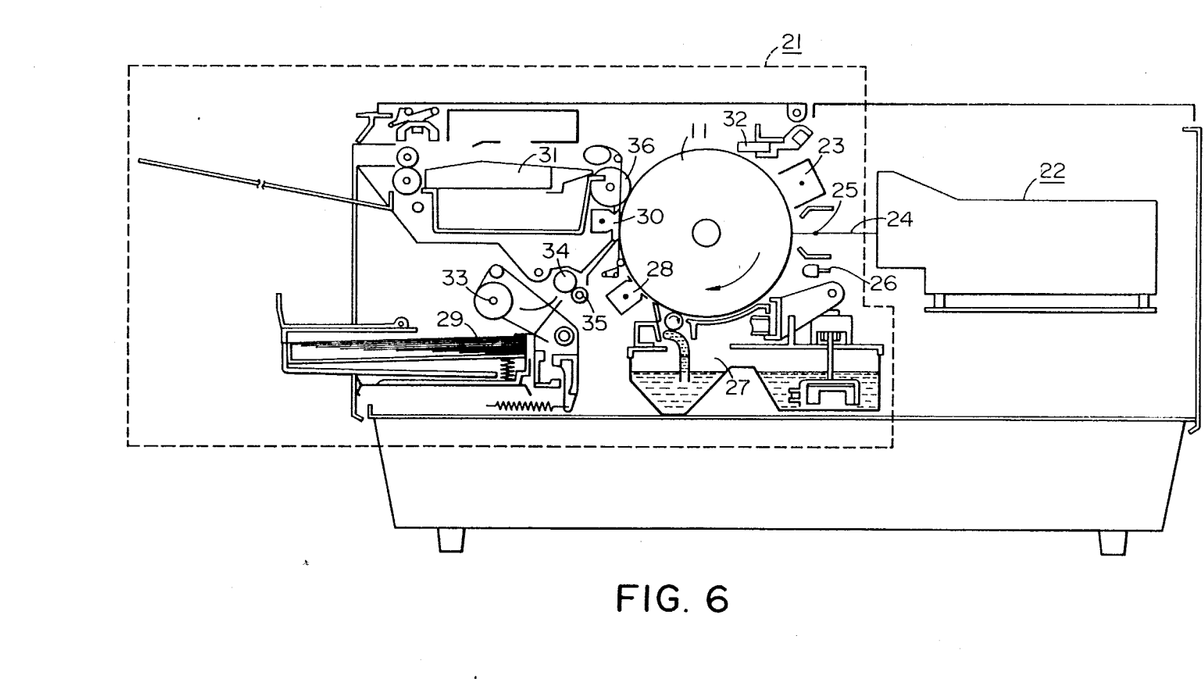

FIGS. 5 and 6 show an embodiment in which such optical system is applied to a laser beam printer. The light emitted from a semiconductor laser 1 is collimated by a collimator lens 7, and deflected by a polygon mirror 12, and imaged on a photosensitive drum 11 by an image forming lens 8 having f-θ image forming characteristic. Of the beam deflected by the polygon mirror 12, part of the beam which scans the other area of the photosensitive drum than the requisite scanning area is detected by a photodetector 14 through a mirror 13. The signal detected by this detector 14 is utilized to control the signals for modulating the semiconductor laser 1 and to measure the intensity of the scanning beam. The photosensitive drum basically comprises, for example, an electrically conductive back-up member, a photoconductive layer and an insulating layer. In FIG. 6, reference numeral 21 designates a recording unit using the electrophotographic process, and 22 denotes an optical device for supplying to the recording unit 21 the laser beam modulated by information, as shown in FIG. 5. The insulating layer surface of the photosensitive drum 11 is uniformly pre-charged to the positive or the negative polarity by a first corona charger 23 to cause charge of the opposite polarity to said charging polarity to be captured on the interface between the photoconductive layer and the insulating layer or in the interior of the photoconductive layer, whereafter the laser beam 24 is applied to the charged insulating layer surface while, at the same time, AC corona discharge by an AC corona discharger 25 is applied to the insulating layer surface to thereby form on the insulating layer surface a pattern resulting from surface potential differences created in accordance with the light-and-dark pattern of the laser beam 24, and then the insulating layer surface is uniformly exposed to light from a lamp 26 to form an electrostatic image of high contrast on the insulating layer surface, and further the electrostatic image is developed into a visible image by a developing device 27 with the aid of a developer composed chiefly of charged toner particles, whereafter the visible image passes a precharger 28 and is transferred onto a transfer medium 29 such as paper by a transfer charger 30, and then the transfer paper 29 is separated from the photosensitive drum 11 by a separator 36, whereafter the transferred image in fixed by a fixing device 31 using an infrared ray lamp or a heat plate, thereby providing an electrophotographic print image. On the other hand, after the image transfer, the insulating layer surface is cleaned by a cleaning device 32 to remove any charged particles remaining thereon and thus, the photo-sensitive drum 11 becomes available for reuse.

Designated by 33 is a paper feeding roller. The transfer paper 29 fed by such roller 33 is nipped between register rollers 34 and 35, and the transfer paper 29 is transported to the image transfer station by the rollers 34 and 35 upon application of a feed instruction.

The present invention, as noted in the above-described application, is effective for an apparatus in which the gamma of the sensitive medium is erect.

As has been described above, in the optical system for semiconductor laser according to the present invention, the image forming optical system is constituted by two partial systems, of which the partial system near the light source has a focal length $f_c$ which collimates the light beam from the light source, and realization of the peak power is achieved by optimizing the value of the $f_c$. So dividing the optical system into two partial systems and causing the light beam between the two partial systems to assume a substantially afocal state provides the freedom with which the distance between the light source portion and the scanned surface can be arbitrarily selected. This freedom provides the ease with which this laser optical system is applied to optical systems directed to various purposes.

Further, in the present optical system, optimalization of the peak power is achieved by selection of the focal length of the first image forming optical system, but theoretically, optimization of the peak power can be achieved by selection of the optical constant of the second image forming optical system. However, where the laser optical system of the present invention is applied to an optical system directed to another purpose, for example, where it is combined with a deflecting system so as to be used as a scanning optical system, the degree of freedom of the optical constant of the second image forming optical system is often limited. Accordingly, it is often the case that an optical constant for optimizing the peak power cannot be provided to the second image forming optical system and therefore, it is desirable that the first image forming optical system be provided with means for realizing the peak power.

What we claim is:

1. An image forming optical system using a semiconductor laser, comprising:
   a semiconductor laser having different diverging points and divergence angles of the beam thereof in orthogonal directions;
   a scanned surface on which the beam from said semiconductor laser is condensed; and
   a spherical surface optical system disposed between said semiconductor laser and said scanned surface for condensing the beam from said semiconductor laser on said scanned surface, said spherical surface optical system being formed by a first spherical surface image forming optical system and a second spherical surface image forming optical system as viewed from said semiconductor laser side, the focal length $f_c$ of said first spherical surface image forming optical system being $$f_c^2 = \frac{\gamma}{\sqrt{a_x \cdot a_y}} \left( 1 + \frac{S_x^2}{2\left(1 + \sqrt{\frac{a_x}{a_y}}\right)} \right)$$

$$0.7 < \gamma < 1.4$$

$$S_x = \frac{\pi}{\lambda} \sin^2 \theta_{ox} \cdot A_s$$

$$a_x = 0.97 \cdot \frac{\sin^2 \theta_{ox}}{a^2}$$

$$a_y = 0.97 \cdot \frac{\sin^2 \theta_{oy}}{a^2}$$

where $\gamma$ is a constant, $\lambda$ is the wavelength of said semiconductor laser, $A_s$ is the interval between the diverging origins of the semiconductor laser, $\theta_{ox}$ is the angle of expanse of the location whereat the energy of the beam is $1/e^2$ in the x-direction expanse of the beam from said semiconductor laser, $\theta oy$ is the angle of expanse of the location whereat the energy of the beam is $1/e^2$ in the y-direction expanse of the beam from said semiconductor laser and $a$ is an exit pupil radius of said first spherical surface optical system.

2. The optical system according to claim 1, wherein deflecting means is disposed between said first spherical surface image forming optical system and said second spherical surface image forming optical system.

3. The optical system according to claim 2, wherein said deflecting means is a polygon mirror and said second spherical surface image forming optical system has f-$\theta$ image forming characteristic.

4. A scanning recording apparatus using a semiconductor laser, comprising:
   a semiconductor laser having different diverging origins and divergence angles in the longitudinal direction and lateral direction thereof;
   a photosensitive medium having the surface thereof scanned by the beam from said semiconductor laser;
   a spherical surface image forming optical system disposed between said semiconductor laser and said photosensitive medium for causing the beam waist position of the direction component of the beam from said semiconductor laser which has a greater divergence angle to be coincident with the surface of said photosensitive medium; and
   deflecting means disposed between said semiconductor laser and said photo-sensitive medium for deflecting the beam from said semiconductor laser in a predetermined direction.

5. The recording apparatus according to claim 4, wherein said spherical surface image forming optical system comprises, in succession from the semiconductor laser side, a collimator lens system and a scanning lens system having f-θ characteristic, and the spot intensity of the beam on the surface of said photo-sensitive medium is controlled by adjusting the focal length of said collimator lens system.

6. The recording apparatus according to claim 5, wherein the focal length $f_c$ of said collimator lens is $$f_c^2 = \frac{\gamma}{\sqrt{a_x \cdot a_y}} \left\{ 1 + \frac{S_x^2}{2\left(1 + \sqrt{\frac{a_x}{a_y}}\right)} \right\}$$

$$0.7 < \gamma < 1.4$$

$$S_x = \frac{\pi}{\lambda} \sin^2\theta_{ox} \cdot A_s$$

$$a_x = 0.97 \cdot \frac{\sin^2\theta_{ox}}{a^2}$$

$$a_y = 0.97 \frac{\sin^2\theta_{oy}}{a^2}$$

where $\gamma$ is a constant, $\lambda$ is the wavelength of said semiconductor laser, $A_s$ is the interval between the diverging origins of the semiconductor laser, $\theta_{ox}$ is the angle of expanse of the location whereat the energy of the beam is $1/e^2$ in the x-direction expanse of the beam from said semiconductor laser, $\theta_{oy}$ is the angle of expanse of the location whereat the energy of the beam is $1/e^2$ in the y-direction expanse of the beam from said semiconductor laser and a is an exit pupil radius of said first spherical surface optical system.

* * * * *

UNITED STATES PATENT OFFICE
CERTIFICATE OF CORRECTION

Patent No. 4,323,297              Dated April 6, 1982

Inventor(s) NAOTO KAWAMURA, ET AL.

It is certified that error appears in the above-identified patent and that said Letters Patent are hereby corrected as shown below:

Column 1, line 57, after "is" add --a--.

Column 3, line 53, "west" should read --waist--;
        line 55, "west" should read --waist--.

Column 5, line 7, change "$\infty \atop -\infty$" to --$\int_{-\infty}^{\infty}$--;

line 25, change "$\infty \atop -\infty$" to --$\int_{-\infty}^{\infty}$--;

line 29, "dx " should read --$dx_1$--.

UNITED STATES PATENT OFFICE
CERTIFICATE OF CORRECTION

Patent No. 4,323,297                    Dated April 6, 1982

Inventor(s) NAOTO KAWAMURA, ET AL.

It is certified that error appears in the above-identified patent and that said Letters Patent are hereby corrected as shown below:

Column 7, line 9, "collimater" should read --collimator--.

Column 9, line 16, "in" should read --is--.

Column 10, line 35, "θoy" should read --$\theta_{oy}$--.

Signed and Sealed this

*Seventh* Day of *September 1982*

[SEAL]

Attest:

Attesting Officer

GERALD J. MOSSINGHOFF

*Commissioner of Patents and Trademarks*